United States Patent
Heide et al.

(10) Patent No.: US 10,294,730 B2
(45) Date of Patent: May 21, 2019

(54) COUPLING APPARATUS FOR CONNECTING TWO DRILL PIPE SECTIONS AND A METHOD OF USING SAME

(71) Applicant: WellPartner AS, Tananger (NO)

(72) Inventors: Haaken Christopher Heide, Sandnes (NO); Kenneth Skinnes, Stavanger (NO)

(73) Assignee: WellPartner AS, Tananger (NO)

( * ) Notice: Subject to any disclaimer, the term of this patent is extended or adjusted under 35 U.S.C. 154(b) by 280 days.

(21) Appl. No.: 15/127,927

(22) PCT Filed: Mar. 24, 2015

(86) PCT No.: PCT/NO2015/050052
§ 371 (c)(1),
(2) Date: Sep. 21, 2016

(87) PCT Pub. No.: WO2015/152729
PCT Pub. Date: Oct. 8, 2015

(65) Prior Publication Data
US 2017/0101829 A1   Apr. 13, 2017

(30) Foreign Application Priority Data

Mar. 31, 2014  (NO) .................................. 20140415

(51) Int. Cl.
*E21B 17/02*   (2006.01)
*F16L 23/024*   (2006.01)
(Continued)

(52) U.S. Cl.
CPC .......... *E21B 17/046* (2013.01); *E21B 17/026* (2013.01); *E21B 19/16* (2013.01); *F16L 23/024* (2013.01); *F16L 23/032* (2013.01)

(58) Field of Classification Search
None
See application file for complete search history.

(56) References Cited

U.S. PATENT DOCUMENTS 1,054,812 A    3/1913   Zierath
1,502,428 A *  7/1924   Getty ...................... E21B 7/061
                                          166/117.6
(Continued)

FOREIGN PATENT DOCUMENTS

NO    334034    11/2013
SU    560965     6/1977
(Continued)

OTHER PUBLICATIONS

International Search Report, PCT/NO2015/050052, dated Jun. 23, 2015.
(Continued)

*Primary Examiner* — Shane Bomar
(74) *Attorney, Agent, or Firm* — Andrus Intellectual Property Law, LLP

(57) ABSTRACT

A coupling apparatus and a method are for connecting two drill-pipe sections in a string of drill-pipe sections joined together by tool joints. The coupling apparatus comprises: a first pipe with a first end portion and a second end portion, the first end portion being provided with a tool joint for connection to a drill-pipe section; a second pipe with a first end portion and a second end portion, the first end portion being provided with a tool joint for connection to a drill-pipe section.

16 Claims, 15 Drawing Sheets

(51) Int. Cl.
*E21B 17/046* (2006.01)
*E21B 19/16* (2006.01)
*F16L 23/032* (2006.01)

(56) References Cited

U.S. PATENT DOCUMENTS

| | | | | |
|---|---|---|---|---|
| 1,923,132 | A | * | 8/1933 | Witkin .................. E21B 17/06 285/2 |
| 3,148,894 | A | | 9/1964 | Schwab |
| 3,299,951 | A | * | 1/1967 | Todd ...................... E21B 29/12 166/298 |
| 3,659,877 | A | * | 5/1972 | Kubasta ................ F16B 31/021 285/3 |
| 3,842,914 | A | | 10/1974 | Mott |
| 4,169,507 | A | * | 10/1979 | Szymczak ........... E21B 33/0355 166/340 |
| 4,364,587 | A | * | 12/1982 | Samford ................ E21B 17/02 166/377 |
| 4,422,508 | A | | 12/1983 | Rutledge et al. |
| 4,424,988 | A | * | 1/1984 | Cowx .................. E21B 17/085 285/18 |
| 5,201,814 | A | * | 4/1993 | Kitchell ................ E21B 17/023 166/377 |
| 5,382,056 | A | | 1/1995 | Milberger |
| 7,100,696 | B2 | * | 9/2006 | Marshall ................ E21B 17/06 166/242.6 |
| 9,353,602 | B2 | * | 5/2016 | Kongshem .......... E21B 41/0007 |
| 2003/0062169 | A1 | | 4/2003 | Marshall |
| 2004/0207202 | A1 | | 10/2004 | Parks |
| 2009/0301711 | A1 | | 12/2009 | Jagert et al. |
| 2009/0304454 | A1 | * | 12/2009 | Edwards ............... E21B 19/006 405/224.4 |
| 2010/0282474 | A1 | | 11/2010 | Mohr |
| 2011/0127041 | A1 | | 6/2011 | Edwards et al. |
| 2012/0132433 | A1 | * | 5/2012 | Olsen .................... E21B 17/06 166/345 |
| 2012/0205118 | A1 | | 8/2012 | Edwards |
| 2014/0050522 | A1 | | 2/2014 | Slaughter, Jr. et al. |

FOREIGN PATENT DOCUMENTS

| | | |
|---|---|---|
| WO | 2011074984 | 6/2011 |
| WO | 2013071983 | 5/2013 |

OTHER PUBLICATIONS

Written Opinion, PCT/NO2015/050052, dated Jun. 23, 2015.
Written Opinion, PCT/NO2015/050052, dated Mar. 9, 2016.
International Preliminary Report on Patentability, date of completion Jun. 6, 2016.
Norwegian Search Report, Application No. NO 20140415, dated Sep. 24, 2014.

* cited by examiner

COUPLING APPARATUS FOR CONNECTING TWO DRILL PIPE SECTIONS AND A METHOD OF USING SAME

CROSS-REFERENCE TO RELATED APPLICATIONS

This application is the U.S. national stage application of International Application PCT/NO2015/050052, filed Mar. 24, 2015, which international application was published on Oct. 8, 2015, as International Publication WO 2015/152729 in the English Language. The International Application claims priority of Norwegian Patent Application No. 20140415, filed Mar. 31, 2014. The international application and Norwegian application are both incorporated herein by reference, in entirety.

FIELD

The present invention relates to a coupling apparatus. More particularly, the invention relates to a coupling apparatus for connecting two drill-pipe sections in a string of drill-pipe sections connected by tool joints. The primary area of application of the coupling apparatus is in a portion of a drill pipe located between a subsea installation and a floating vessel, but in some embodiments it may also be used in a well in the ground. The following description is directed, to a great extent, towards the primary area of application of the coupling apparatus.

BACKGROUND

In offshore operations in which a drill pipe is in a locked-to-bottom mode from a floating vessel, a heave-compensator system is used aboard the vessel to maintain a constant tension on the drill pipe. However, if a situation arises in which the compensator locks, a heave by the vessel will generate a very high tension on the drill pipe. Another challenge of a floating vessel relates to situations in which the vessel may uncontrolledly start to drift away from an optimum positioning over a well which is connected via a drill-pipe string from said vessel, which, in turn, will lead to the vessel generating a very high tension on the drill pipe. Such drifting may be due to breakage in one or more anchors or faults in digital positioning systems for the floating vessel which is equipped with such digital positioning systems. The tension on the drill pipe will presumably either break the drill pipe or cause serious damage to the Christmas tree or wellhead or to the vessel. Irrespective of which part is broken or damaged in such a situation, fatal situations may arise.

To avoid such a fatal situation it is known to provide a weak point in the drill pipe. Such a weak point, which is also known by persons skilled in the art as a "weak link", may be provided by reducing the cross-sectional area of the drill pipe at a predetermined level in the given drill string, represented by one of the drill-pipe sections. Alternatively, or additionally, a so-called "shear sub" of limited capacity may be arranged inside an underwater BOP (blowout preventer).

Both the weak link and the shear sub have several drawbacks. The tensile capacity of the drill string cannot be changed while the drill string is in operation, or immediately before an installation operation is started. Further, the weak link represents limitations to the overall operation, especially with respect to torsion, bending and tensile capacities. The latter is especially a drawback if a scenario with a stuck drill pipe arises, in which the drill pipe will have to be freed by means of pulling. A further drawback is that it may be challenging to retrieve the lower part of a drill string after a drill string has been torn apart at said weak link. This is a time-consuming and expensive operation. Yet another drawback is that the tensile capacity of a weak link must be tested with respect to mechanical properties of the pipe material.

The above-mentioned drawbacks have led to several inventions which provide solutions that may be alternatives to said weak link. Most of these inventions relate to a disconnecting system for high-pressure riser systems, which could, in principle, have been used for operations in which a drill-pipe string is used. A challenge of said disconnecting systems is high complexity to ensure safety, and further to prevent emissions of hydrocarbons into the external environment as high-pressure riser systems are used in operations in which a floating vessel is connected to an active well. The high complexity may be a drawback in itself because of technical unreliability.

Offshore operations in which a drill pipe is in a locked-to-bottom mode from a floating vessel are often performed in connection with pressureless wells so that there is a lower risk with respect to safety and external environment than what is typical of operations with riser systems. It may thus be appropriate to have disconnecting systems that have a lowest possible technical complexity for reliability to be ensured, while at the same time, safety is ensured and damage to critical equipment is avoided if one or more of said challenges of a floating vessel should arise. Further, it turns out in several cases that it may be appropriate to place such a disconnecting system as close to the seabed as possible to avoid leaving behind a relatively long drill string on top of subsea equipment such as a Christmas tree or a BOP. A long drill string projecting up from the top of said subsea equipment after a release will entail drawbacks and challenges. Such drawbacks and challenges will be known to a person skilled in the art and thus are not explained any further here.

In this connection it should be mentioned that, in several operations, said drill string, also referred to as a drill pipe in what follows, will be run on the inside of a drill-pipe-and-riser system (marine riser) which involves physical limitations on a disconnecting system which is to be placed as close to the subsea equipment as possible. Further, in most cases, there is a need to be able to extend control lines that are necessary for the operation of said subsea equipment from the vessel along the drill pipe on the inside of said drill-pipe-and-riser system.

U.S. Pat. No. 5,382,056 discloses a coupling with a weak connection for a riser string. The weak connection includes an arming device. The arming device allows the coupling with the weak connection to split at a minimum axial force only when an operator puts the arming device in an armed position.

SU 560965 discloses a quick-release for drill pipes, in which a connection between two pipes is provided by means of male and female portions including tapering helical threads. The connection is released when a tensile force is above a preset value.

U.S. Pat. No. 3,842,914, US 2009/0301711 and U.S. Pat. No. 3,148,894 disclose connections for drill pipes which are deactivated by an object being dropped from the surface of the well.

US 2010/0282474 A1 discloses a coupling for use on a pipe in connection with platforms at sea. The coupling includes a first portion and a second portion which are displaceably engaged with each other and which are releasably attached to each other by means of a hydraulically activated locking element.

WO 2011/074984 A1 discloses a release module for attaching a pipe string in a heave-compensated, load-bearing unit in a derrick on an offshore platform.

WO 2013/071983 A1 discloses a disconnecting system for high-pressure riser systems including a release device which is activated if a tensile force exceeds a preset threshold force, and a release device which is activated if a compressive force exceeds a preset threshold force.

US 2011/0127041 discloses a disconnecting system for high-pressure riser systems including a release device and a pressure-application unit adapted to apply a coupling force to at least partially eliminate a separation force applied as a result of well pressure. The well-pressure separation force acts to separate upper and lower parts of the release device.

US 2014/050522 discloses a connection for transmitting rotational forces from a rotating drilling machine to a drill string in a so-called horizontal drilling process. A so-called "saver sub" is used as a connection to transmit the rotational forces when a drill string is run into or out of a borehole.

US 2012/205118 discloses a tensioning apparatus for applying a substantially constant tension to a workover riser. The tensioning apparatus includes a first part which is adapted to be coupled to a workover riser, a second part which is adapted to be coupled to a marine riser and a tensioning device which provides relative movement between the first part and the second part to tension the workover riser.

NO 334034, belonging to the present applicant, discloses a coupling apparatus and a method of connecting two drill-pipe sections in a string of drill-pipe sections joined together by tool joints. The coupling apparatus includes a first coupling portion provided with a first pipe which has a first end portion and a second end portion, the first end portion being provided with a tool joint for connection to a drill-pipe section; a second coupling portion provided with a second pipe which has a first end portion and a second end portion, the first end portion being provided with a tool joint for connection to a drill-pipe section. The first and second coupling portions are arranged for displaceable engagement until the second end portion of the first pipe has been joined to the second end portion of the second pipe to provide a continuous bore through the apparatus, the apparatus further including an engagement device for releasably attaching the first coupling portion to the second coupling portion and transmitting, through the apparatus, an axial load on the string of drill-pipe sections. The engagement device is provided with a mechanically adjustable control means for controlling an axial-load-carrying capacity of the apparatus, the control means including a movable element arranged for movement in an axial direction of the apparatus between a first position and a second position. The apparatus functions satisfactorily, but involves a relatively complex structure.

SUMMARY

The invention has for its object to remedy or reduce at least one of the drawbacks of the prior art or at least provide a useful alternative to the prior art.

The object is achieved through the features which are specified in the description below and in the claims that follow.

In a first aspect of the present invention, a coupling apparatus for connecting two drill-pipe sections in a string of drill-pipe sections joined together by tool joints is provided, the coupling apparatus comprising: a first pipe with a first end portion and a second end portion, the first end portion being provided with a tool joint for connection to a drill-pipe section; a second pipe with a first end portion and a second end portion, the first end portion being provided with a tool joint for connection to a drill-pipe section; each of the second end portions of the pipes further being provided with a flange provided with at least two spaced-apart bores which are each arranged to receive a bolt so that the flanges and the bolts form a flange connection configured to hold the first pipe and the second pipe fixed against axial movement relative to each other. Each of the first pipe and the second pipe is provided with a mutual engagement means configured to resist rotation relative to each other, and the bolts are configured to break at a predetermined axial load.

The engagement means may be arranged in the flanges.

By a bolt is meant, in this document, an elongated body with a sufficient and predictable tensile strength. Thus, a bolt for use in the present invention may be made from metal. Still, a bolt for use in the present invention may be made from a non-metallic material such as a plastic material, a composite material, bundled or interlaced fibres, glued sections, or a combination of two or more of these.

The bolt may have any suitable profile with or without axial symmetry.

The engagement means will thus transmit torsional forces applied to the pipe string by a rotary motor located on a vessel, for example, from the first pipe to the second pipe and on to the drill-pipe section connected to the second pipe portion. Provided the engagement means of the flanges is formed in such a way that it does not allow relative movement between the flanges, the bolts will, in all essentials be subjected to axial forces or so-called tensile forces and, thus, not shear forces. This has the effect of allowing the breaking load of the coupling apparatus to be determined from the axial load to which it is subjected, which means that a desired breaking load depends on the overall tensile capacity of the bolts.

The engagement means may include a castellated element arranged in each of the flanges, such that the castellated element of one of the flanges is complementarily adapted to the castellated element of the other one of the flanges. The castellated element may include fingers projecting from each of the flanges and being configured to be joined together. In one embodiment, the fingers are joined only side by side. In an alternative embodiment, portions of the fingers are joined side by side along the peripheral portion of the flange, whereas other portions of the fingers are joined together in the radial direction of the flange.

In one embodiment, the engagement means includes a series of engagement pins and complementarily adapted engagement bores. One of the flanges may be provided only with engagement pins, whereas the other one of the flanges may be provided with engagement bores only. Alternatively, each of the flanges may be provided with engagement pins and engagement bores.

The end portions of the bolt are each connected to a respective flange portion in such a way that the bolt is axially displaceable through the bore of at least one of the flanges, and that the axially displaceable bolt is connected to said at least one flange by means of a nut which has been brought into abutment against an end portion of the flange.

In one embodiment, one of the end portions of the bolt is threadedly connected to the bore of one of the flanges, whereas the other one of the end portions of the bolt is connected to the other flange by means of said nut.

Especially in those cases in which the drill string extends in the open sea between a subsea installation and a vessel on the sea surface, the drill string may be subjected to a considerable bending moment. As the coupling apparatus constitutes a portion of the drill string, such a bending moment must be transmitted through the flange connection. To avoid or at least reduce any difference in load between the bolts of the flange connection in consequence of said bending moment, the coupling apparatus must be sufficiently rigid. Such rigidity may be achieved by means of the engagement means. A particularly good rigidity could be achieved if the castellated elements are of a design in which portions of the fingers are joined side by side along the peripheral portion of the flange, whereas other portions of the fingers are joined in the radial direction of the flange.

As an alternative or an addition to letting the bending moment be absorbed by the flange portion itself, the second end portion of one of the pipes may be provided with a female portion for receiving a complementarily adapted male portion arranged on the second end portion of the other one of the pipes, the female portion and the male portion being arranged for axial displacement relative to each other. The female and male portions are configured to absorb a bending moment applied to the coupling apparatus, so that the bending moment may be ignored when calculating the maximum axial force that the coupling apparatus is dimensioned to carry. Such an overlap between the first pipe and the second pipe could thus provide a coupling apparatus having the desired rigidity while at the same time being easy to make.

As an addition to or as an alternative to the castellated element, the engagement means may be provided by means of an engagement means placed in the external surface of the male portion and in the internal surface of the female portion. In one embodiment, said engagement means of the female and male portions is a spline coupling or other similar means suitable for preventing rotation between the first pipe and the second pipe.

As a consequence of the coupling apparatus according to the invention including a flange, the flange portion of the coupling apparatus will necessarily have a larger radial extent than the pipe portions of the coupling apparatus. Such an increased radial extent may represent challenges with respect to, for example, a cable extending along the exterior of the drill string, especially in those cases in which the drill string is positioned in a riser or a so-called marine riser. The cable may be a so-called umbilical, for example, which will be well known to a person skilled in the art.

In order to at least reduce said challenges, the flange connection may be provided with one or more recesses extending in a longitudinal direction of the coupling apparatus, the recess being arranged to house at least a portion of a cable extending along the coupling apparatus.

In the embodiment described above, the tensile capacity of the drill string is defined by the overall tensile capacity of the bolts. I some cases, there may be a need to be able to provide a tensile capacity greater than the one that can be provided by the bolts. Such a case may be when the drill string is used to carry a piece of well equipment from the vessel to the sea bed, wherein the equipment must pass the sea surface or the splash zone in which there may be large waves. Another case is when the drill string is stuck and must be pulled loose.

To be able to provide such a desired tensile capacity, the coupling apparatus may further be provided with a selectively releasable carrier sleeve which surrounds at least a portion of the first pipe and the second pipe. The carrier sleeve may be arranged to rotate around the longitudinal axis of the coupling apparatus between a first position and a second position, wherein, in the first position, the carrier sleeve is lockingly engaged with both the first pipe and the second pipe, but wherein, in the second position, the carrier sleeve is disengaged from at least one of the first pipe and the second pipe.

In those cases in which the carrier sleeve is lockingly engaged with both the first pipe and the second pipe, the coupling apparatus will be described, in what follows, as being in a "strong mode". Correspondingly, the coupling apparatus will be described as being in a "weak mode" or "safe mode" when, in the second position, the carrier sleeve has been disengaged from at least one of the first pipe and the second pipe.

In a preferred embodiment, the carrier sleeve is configured to be able to carry an axial force greater than the axial force that can be carried by the at least two bolts together. Preferably, the carrier sleeve alone is arranged to carry the major part of the axial forces when the coupling apparatus is in a strong mode. Preferably, the carrier sleeve has an axial-force capacity which is equal to or greater than the axial-force capacity of the drill string.

An engagement between the first pipe and the second pipe may have been provided by means of an engagement means including a series of latch splines spaced apart around a portion of the external surface of the coupling apparatus, and a series of latch splines arranged on the internal surface of the carrier sleeve. For the engagement to be releasable, one of the series of latch splines has a length which is smaller than or equal to the spacing of the series of latch splines in the other one of the series of latch splines. A predetermined rotation of the carrier sleeve will thereby disengage the latch splines from each other. Such a rotation may be for example, but is not limited to, ⅛ of a rotation of the carrier sleeve around its centre axis.

The engagement means is preferably formed in such a way that, in consequence of a relative axial movement between the first pipe and the second pipe, the bolts will break before the engagement means of the first pipe and the second pipe disengages. This has the effect of a relative rotation between said pipes not occurring before the bolts have broken. Further, the engagement means may have an extent in the axial direction of the apparatus which is greater than the overall axial extent of the latch splines. This has the effect of the engagement means being engaged until the latch splines of the carrier sleeve are at an axial distance from the latch splines of the flange. The engagement means will thus prevent the carrier sleeve from being brought into a strong mode in consequence of unintentional relative rotation between the first pipe and the second pipe. In one embodiment, the latch splines are arranged in a helix relative to the longitudinal axis of the coupling apparatus. This has the effect of the locking device in its strong mode being able to bring about a gradual tensioning which will absorb any play between the latch splines and thus relieve the bolts.

As an alternative to said latch splines, an engagement between the first pipe and the second pipe may be provided by means of an engagement means including threads arranged around a portion of the external surface of the coupling apparatus, and a series of complementarily fitting threads arranged on a portion of the internal surface of the carrier sleeve. This alternative will require a larger rotation of the carrier sleeve than what is the case with the above-mentioned embodiment with latch splines.

The engagement means of the coupling apparatus may be arranged on a portion of one of the flanges of the coupling apparatus and on the portion of the carrier sleeve. Fixing against axial movement between the first pipe and the second pipe may be provided by the one of the flanges that is not provided with the engagement means having been brought into abutment against a shoulder portion arranged in an end portion of the carrier sleeve.

In an alternative embodiment, the engagement means is arranged on a collar which is attached to one of the pipes with a distance to the flange, between the flange and the first end portion of the pipe. The collar may be an integral part of the pipe, or then it may be attached to the pipe by means of a threaded connection, for example.

On a tensile failure of the coupling apparatus, the bolts which are axially displaceable through the bore of at least one of the flanges will have been released from said at least one flange. A person skilled in the art will know that on the occurrence of such a tensile failure, the bolts may "shoot" out of the bores in an uncontrollable manner. This may result in injuries to personnel if such a failure should happen by accident on board a vessel. A bolt torn loose could also cause damage to subsea equipment.

To at least reduce the risk of bolts and nuts leaving the flange bores on a tensile failure, at least one insert may be arranged around one or more portions of the pipe between said collar and flange, the insert being configured to restrict axial movement of the bolt in a direction away from the flange. On bolt breakage, the inserts will thereby prevent loose parts from falling from the bolts and associated nuts. In one embodiment, an end portion of the insert encloses end portions of the bolts projecting from the flange.

According to a second aspect of the present invention, a method of providing a controllable weak connection in a drill string arranged to be in a locked-to-bottom mode is provided, the method comprising: arranging a coupling apparatus according to the first aspect of the invention, in which a predetermined axial-load-carrying capacity of the coupling apparatus is provided by means of at least two bolts connecting two flanges arranged for a first pipe and a second pipe of the coupling apparatus; and fit the coupling apparatus into a portion of the drill string.

The bolts may be pre-tensioned in the coupling apparatus in order thereby to facilitate the determining of the axial-force capacity of the bolts, but in particular to avoid fatigue and to achieve rigidity in the connection.

The method may further include providing the coupling apparatus with a selectively releasable carrier sleeve as explained above in connection with the first aspect of the invention. The carrier sleeve can be controlled, that is to say activated or deactivated, by personnel on board a vessel or by means of an ROV (remotely operated vehicle), for example, after the coupling apparatus has been submerged.

In a third aspect of the invention a drill string including the coupling apparatus as explained above is provided.

In a fourth aspect of the invention, a flange connection is used to provide a controllable weak connection with a predetermined axial-force-carrying capacity.

The invention is defined by the independent claims. The dependent claims define advantageous embodiments of the invention.

BRIEF DESCRIPTION OF THE DRAWINGS

In what follows, an example of a preferred embodiment is described, which is visualized in the accompanying drawings, in which:

FIG. 4b shows an end view, seen from the right towards the left in FIG. 4a;

FIG. 9 shows a cross-sectional view, on a larger scale, in the longitudinal direction of a portion of the left-hand pipe and the carrier sleeve of FIG. 8a;

FIG. 10a shows an alternative embodiment of the coupling apparatus shown in FIG. 8a; and FIG. 10b shows a section, on a larger scale, along the centre axis of the coupling apparatus shown in FIG. 10a.

DETAILED DESCRIPTION OF THE DRAWINGS

Figure 1:
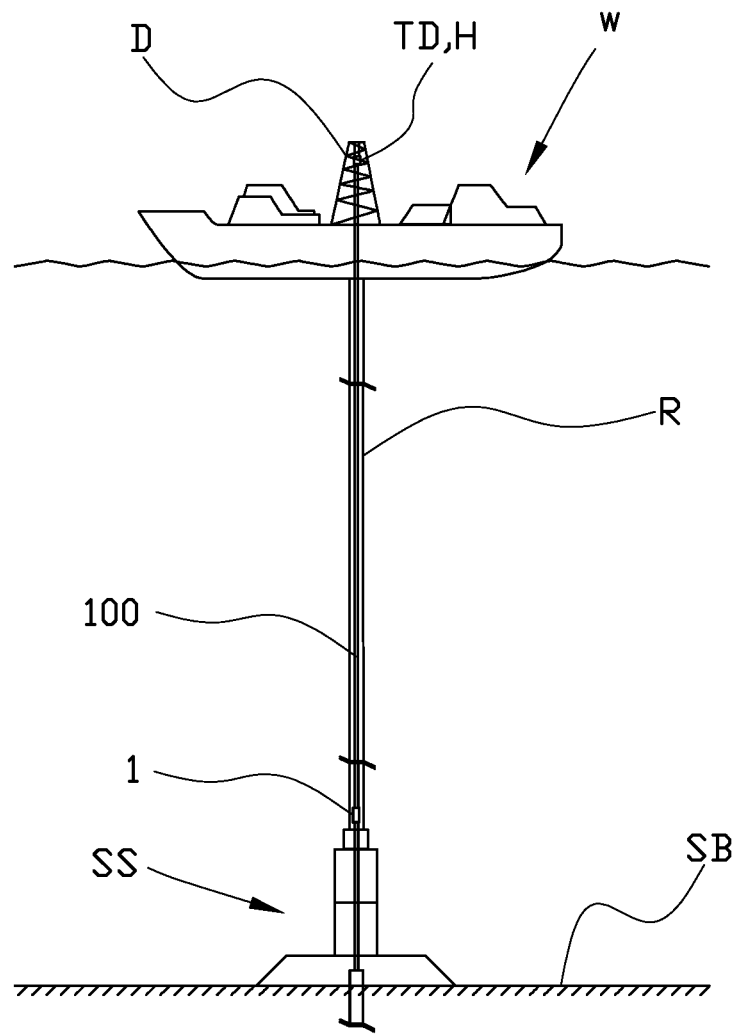
FIG. 1 shows a drill string which extends from a derrick on a floating vessel to a subsea installation, the coupling apparatus according to the present invention being placed in a riser enclosing the drill string.

Positional specifications such as "over", "under", "lower", "upper", "right" and "left", refer to the positions shown in the figures.

In the figures, the same reference numerals indicate the same or corresponding elements. Not all elements are indicated by reference numerals in all the figures. As the figures are only principle drawings, the relative size ratios between individual elements may be somewhat distorted.

In the figures, the reference numeral 1 indicates a coupling apparatus according to the present invention for connecting two drill-pipe sections in a string 100 of drill-pipe sections joined by tool joints.

FIG. 1 shows a drill string 100 extending from a derrick D aboard a floating vessel W. The derrick D is provided with a top drive TD and a heave-compensator apparatus H.

When the drill string 100 is used to transport a tool into a subsea system SS, such as a well, a wellhead or a Christmas tree, and fix it thereto, the drill string 100 is in a so-called locked-to-bottom mode. The distance between the vessel W and said subsea system SS will vary because of waves and the tide cycle. To provide a substantially constant tension on the drill string 100, it is connected to the heave-compensator apparatus H which is carried by the derrick D. The drill string 100 is arranged to be rotated by means of the top drive TD, as will be known to a person skilled in the art.

The drill string 100 and the coupling apparatus 1 are enclosed by a riser R.

Figure 2:
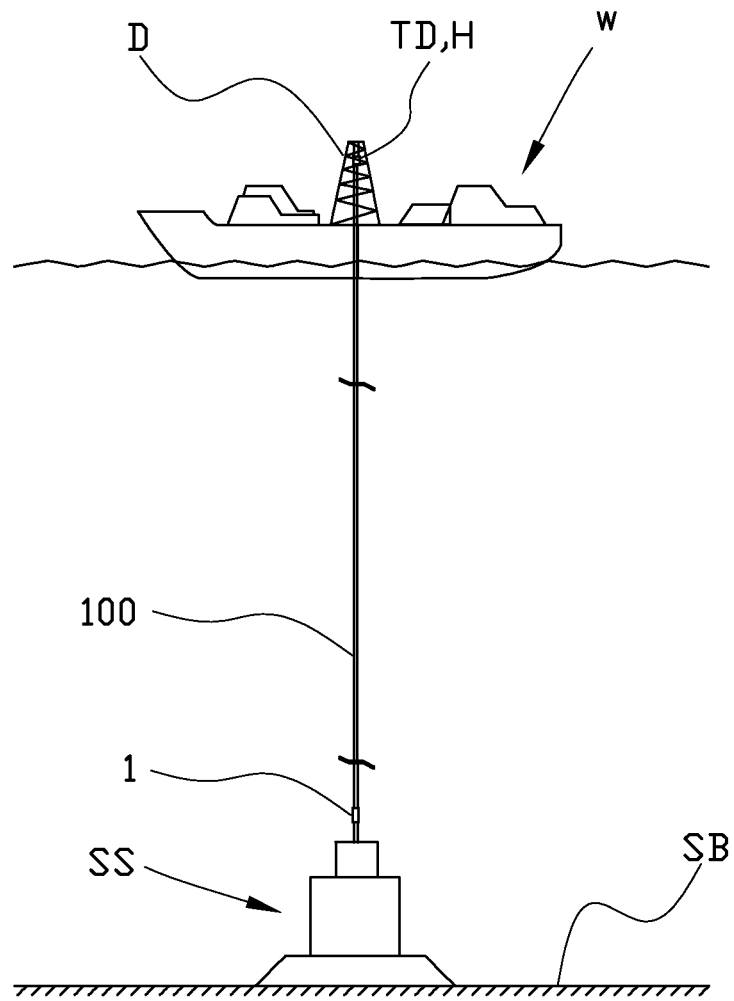
FIG. 2 shows the same as FIG. 1, but the drill string extends in the open sea between the subsea installation and the vessel.

FIG. 2 shows a drill string 100 which is used to carry a Christmas tree to a subsea installation. The drill string 100 extends in the open sea.

In a situation with a heave compensator apparatus H failing at the same time as the vessel W is moved upwards, either the subsea system SS, the drill string 100 or other parts of the equipment on the vessel W may become seriously damaged. Such damage may cause fatal accidents, which will be understood by a person skilled in the art.

One of the purposes of the coupling apparatus 1 is to provide a controllable "weak connection" for a drill string 100 which is locked-to-bottom from a floating vessel W.

The FIGS. 3a to 5b show the coupling apparatus 1 according to the present invention on a larger scale. The coupling apparatus 1 includes a first pipe 10 with a first end portion 12 and a second end portion 14.

The first end portion 12 is provided with a tool joint 16 to be joined to a drill-pipe section by means of a thread not shown. As shown best in FIG. 4c, the tool joint 16 of the first end portion 12 is a female joint.

The coupling apparatus 1 further includes a second pipe 20 with a first end portion 22 and a second end portion 24.

The first end portion 22 of the second pipe 20 is provided with a tool joint 26 to be joined to a drill-pipe section by means of a thread not shown. In the embodiment shown, the tool joint 26 of the first end portion 22 is a male joint.

Each of the second end portions 14, 24 of the pipes 10, 20 is provided with a flange 18, 28. The flanges 18, 28 are provided with bores 30 (ten shown in the figures) which are each arranged to receive a screw or bolt 32 so that the flanges 18, 28 and the bolts 32 form a flange connection configured to hold the first pipe 10 and the second pipe 20 fixed against axial movement relative to each other.

In the exemplary embodiment, the bolt 32 is shown as made from a rod element with threads at both end portions.

Each of the flanges 18, 28 is provided with an engagement means 34 which, in the embodiment shown, is a castellated element. The castellated element 34 of the first pipe 10 complementarily fits the castellated element 34 of the second pipe 20. The purpose of the castellated elements 34 is to prevent relative rotation between the first pipe 10 and the second pipe 20 when the drill string 100 is rotated around its longitudinal axis. The castellated elements 34 thus prevent the bolts 32 from being subjected to shear forces. The bolts 32 are therefore subjected mainly to an axial or tensile load.

The breaking load of the coupling apparatus 1 is therefore defined by the overall breaking load of the bolts 32. The breaking load may therefore be controlled by the number of bolts and/or the material properties of the bolts.

Figure 4A:
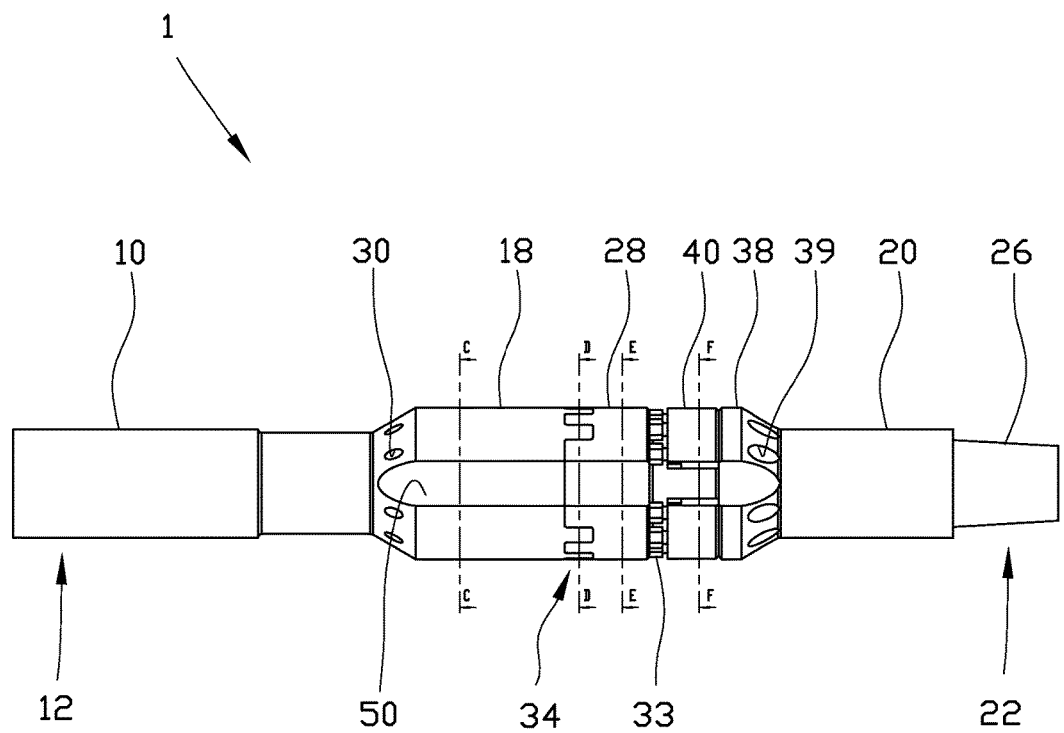
FIG. 4a shows a side view of the coupling apparatus of FIG. 3c.
Figure 4B:
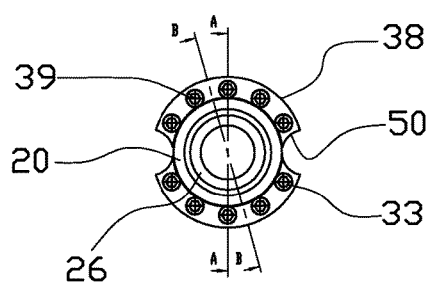
Figure 4C:
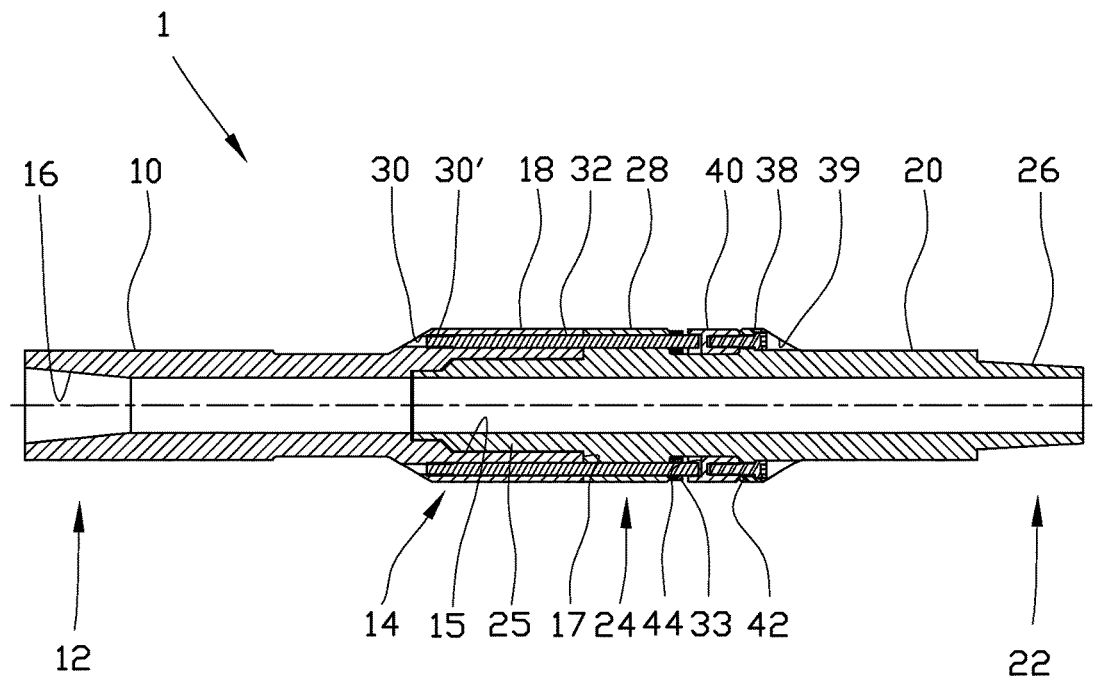
FIG. 4c shows a cross-sectional view seen through the line A-A in FIG. 4b.

In the embodiment shown, a left-hand end portion of the bolt 32 is attached to the flange 18 by means of a threaded connection 30'. This is shown in FIG. 4c, for example. With the exception of the threaded connection 30', the bolt 32 is axially displaceable in the bore 30 of the flange 18 of the first pipe and through the entire bore 30 of the flange 28 of the second pipe 20.

The bolt 32 is connected to the flange 28 of the second pipe 20 by means of a nut 33 which has been screwed into abutment against the end portion of the flange 28, as appears from the figures.

Instead of keeping the bolt 32 attached to the flange 18 by means of the threaded connection 30' of the flange 18, the bolt 32 may be kept attached to the flange 18 in a manner corresponding to that in the flange 28 of the second pipe 20. However, the solution shown has some advantages in relation to "nut connections" as will be explained in what follows with reference to FIG. 3c.

Figure 3A:
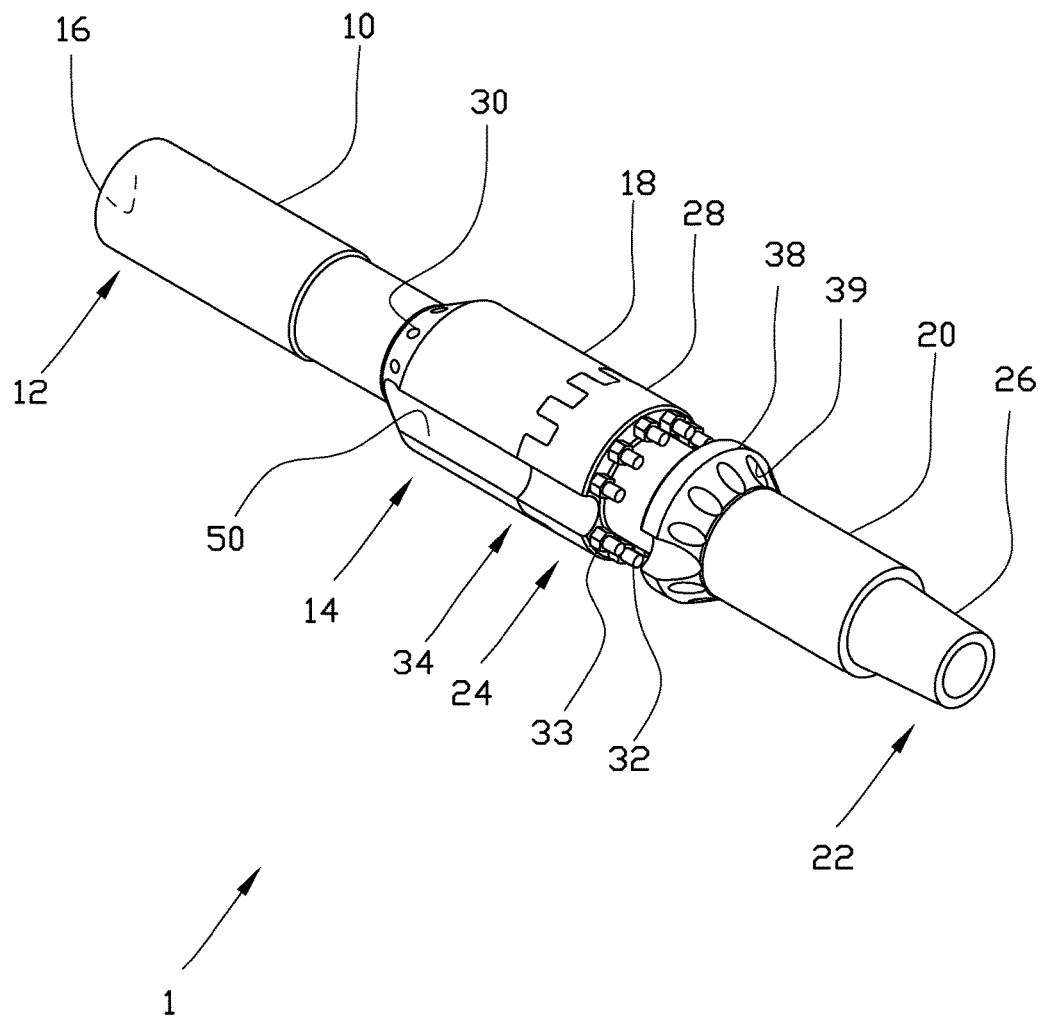
FIG. 3a shows a perspective view, on a larger scale, of one embodiment of the coupling apparatus according to the present invention.
Figure 3B:
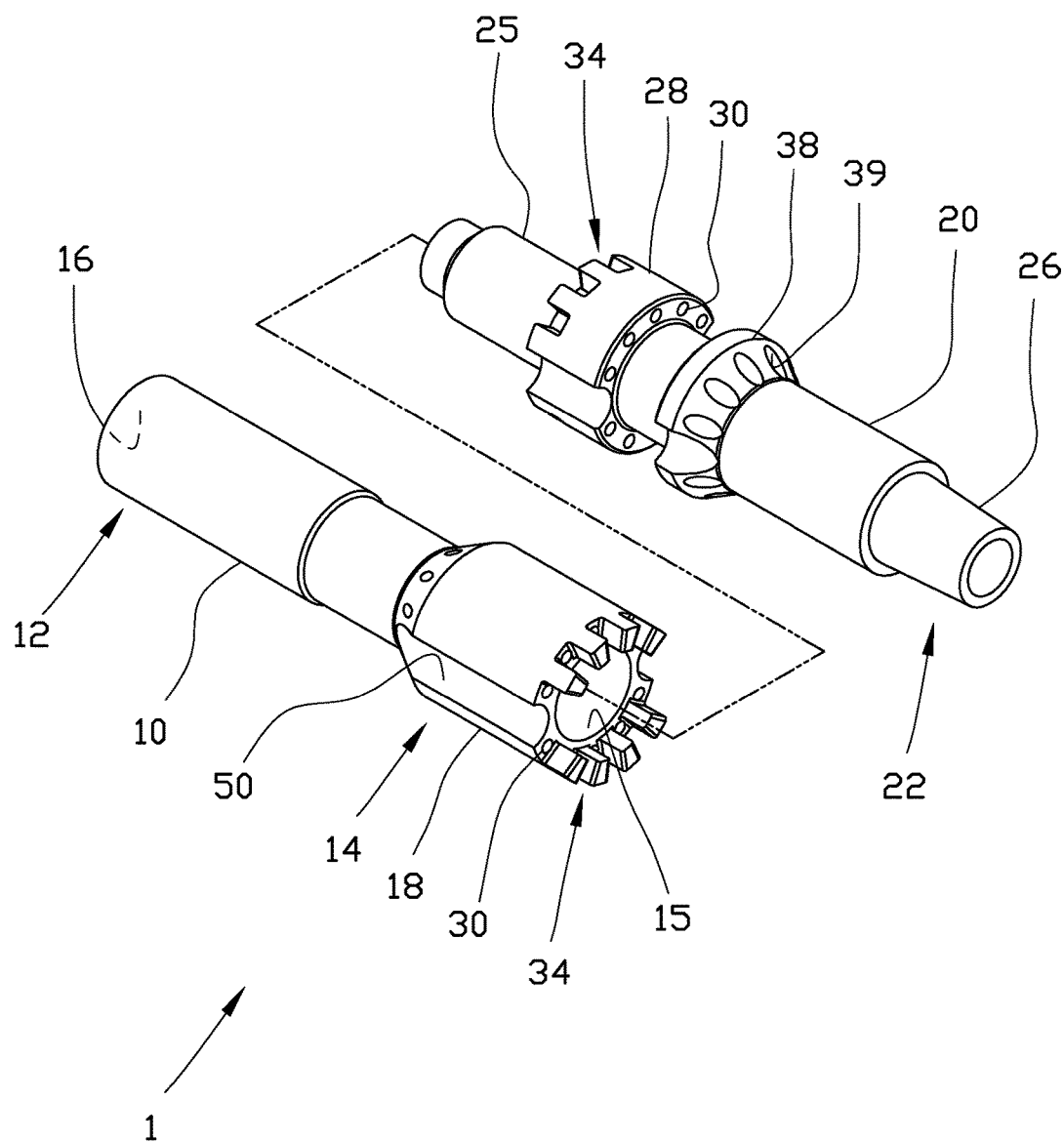
FIG. 3b shows the coupling apparatus of FIG. 3a, a first pipe being separate from a second pipe.
Figure 3C:
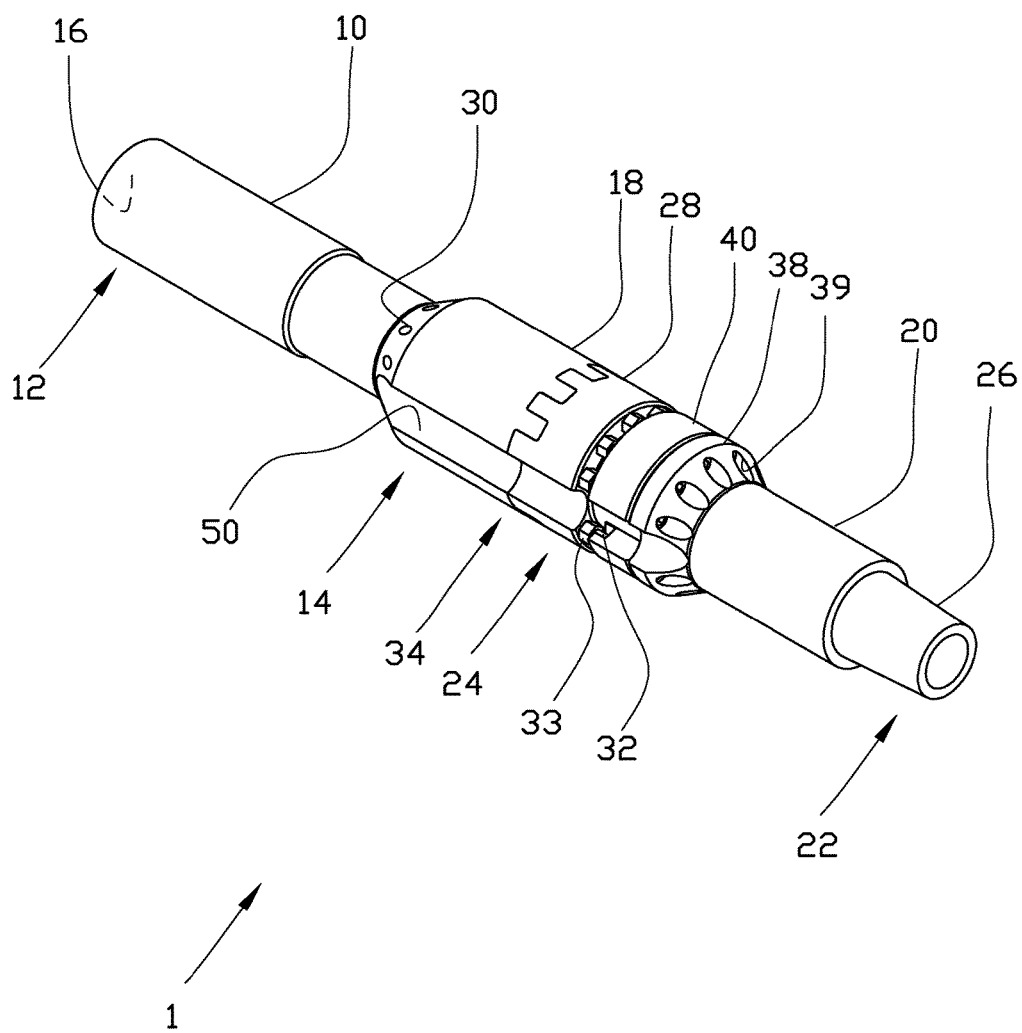
FIG. 3c shows the coupling apparatus of FIG. 3a further provided with an insert.

In FIG. 3c, the coupling apparatus 1 is provided with an insert 40 which is placed around a portion of the second pipe 20 between the flange 28 and a collar 38. In the embodiment shown, the insert includes two C-shaped elements with a curvature adapted to the diameter of the relevant portion of the second pipe 20.

Figure 10A:
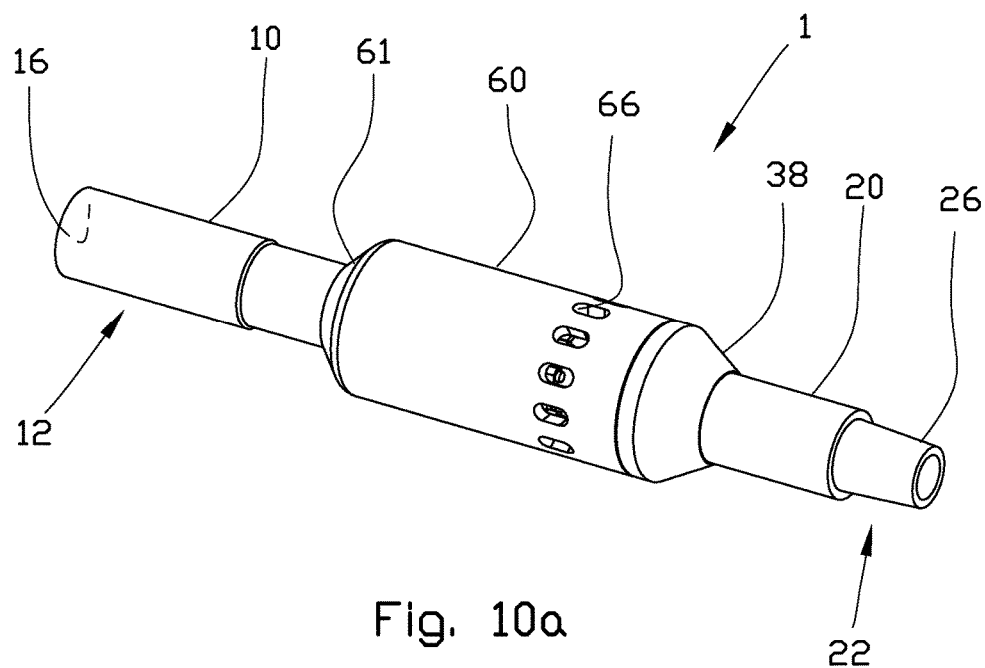
Figure 10B:
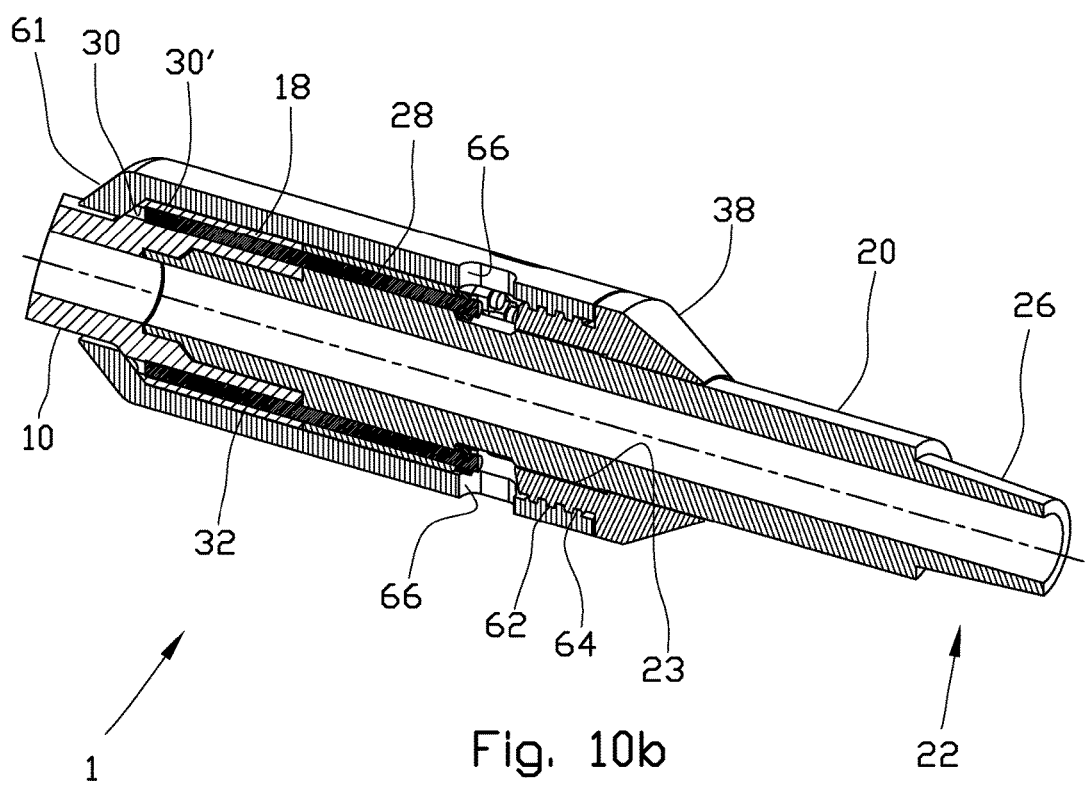

The collar 38 may be an integral part of the pipe 20, or it may be releasably connected to the pipe 20, for example by means of a threaded connection as shown in FIG. 10b. One of the purposes of the collar 38 is to function as a deflector to prevent objects from hitting the bolts 32/nuts 33 as the pipe string 100 with the coupling apparatus 1 is moved in an axial direction.

The primary purpose of the insert 40 is to reduce the risk of the bolts 32 shooting out of the bore 30 together with the nuts 33 on the occurrence of a tensile failure of the bolts 32. The purpose is achieved by the insert at least reducing the axial movement of the bolt 32, and thereby also the nut 33, from the left towards right in FIG. 3c, and preventing the bolt from being released from the bore 30 of the flange 28.

As mentioned above, such an ejection of the bolt 32 could cause damage to personnel if such a rupture should occur by accident aboard a vessel. A bolt 32 torn loose could also cause damage to subsea equipment.

As shown in FIG. 4c, for example, the insert 40 is secured to the collar 38 by means of fixing bolts 42 which have been inserted through bores 39 of the collar 38 and into the insert 40. The bores 39 of the collar 38 both allow the bolts 32 to be put through for simplified mounting and allow a tensioning tool to be used via bolt-like tightening rods which are put through the bores 39 and connected to the bolts 32 which are to be tensioned. In addition, the collar 38 may provide abutment for a pre-tensioning tool.

In the embodiment shown, the insert 40 is further provided with recesses or cut-outs 44 arranged to house an end portion of the bolt 32. Therefore, on a rupture of the bolt 32, the portion of the bolt 32 extending through the flange 28 of the second pipe 20 will still be held sufficiently fixed against both axial and radial movements so that it keeps its position in the flange 28. Correspondingly, the threaded connection 30' of the flange 18 of the first pipe 10 will hold the bolt 32 fixed against movement out of said flange 18.

The insert 40 is placed around the second pipe 20 after the flange connection has been formed and the bolts 32 have preferably been tensioned by means of the nuts 33.

A person skilled in the art will know that positioning and attaching the insert 40 is more laborious than connecting the bolts 32 in the bores 30 by threads as is shown in the figures. Thus, the embodiment shown is to be preferred, even though putting a nut 33 on both end portions of the bolt 32 is possible as well.

A person skilled in the art will understand that tensioning the bolts 32 is advantageous with respect to "play" and fatigue in the bolts, and to achieve a substantially equal load on the bolts 32. Such an equal load is important to achieve as predictable a breaking load as possible for the coupling apparatus 1, but is particularly important in order to at least reduce fatigue in the bolts 32 as will be understood by a person skilled in the art.

A portion of a nut-tightening tool for use when tightening the nuts 33 may be inserted through the bores 39 of the collar 38.

Figure 4D:
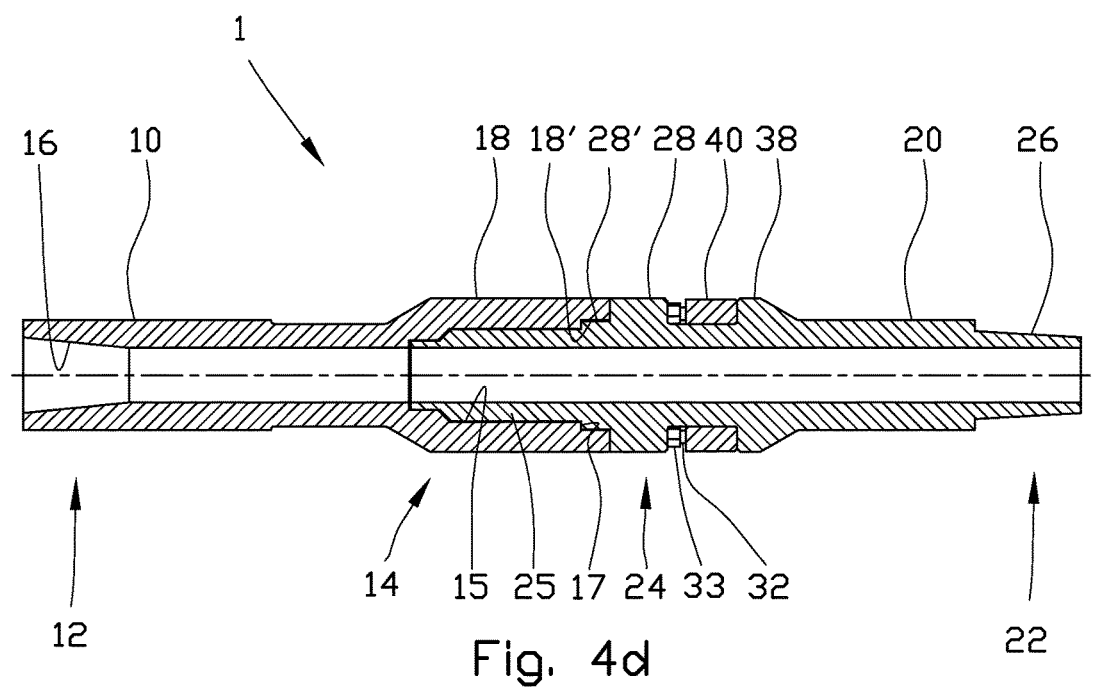
FIG. 4d shows a cross-sectional view seen through the line B-B in FIG. 4b.
Figure 4E:
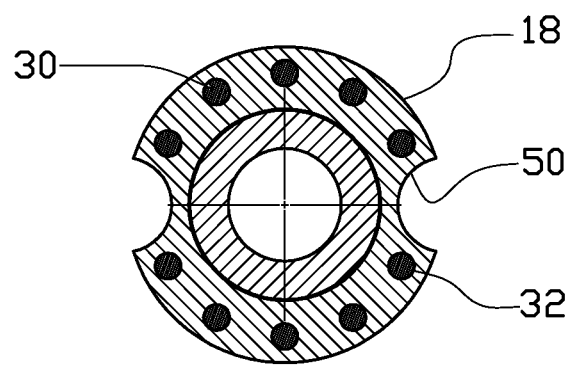
FIGS. 4e-4h show cross-sections on a larger scale, seen through the lines C-C, D-D, E-E and F-F in FIG. 4a, respectively.
Figure 4F:
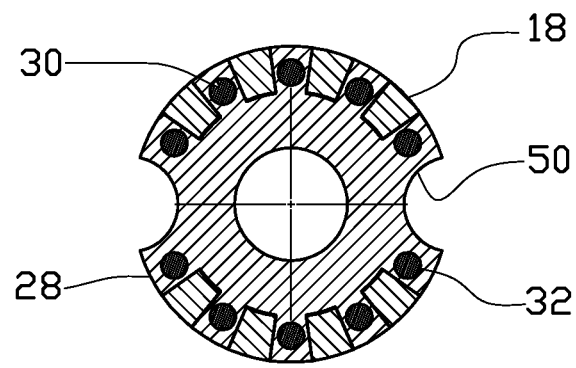
Figure 4G:
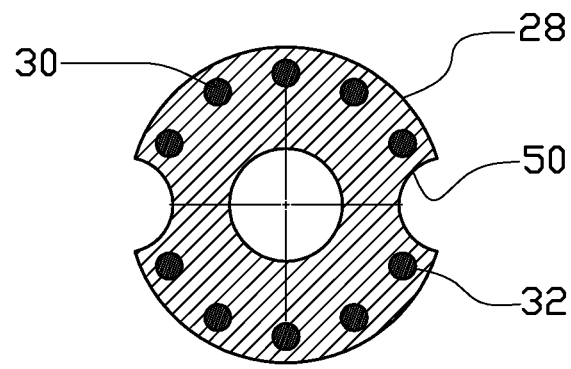

FIG. 4c and FIG. 4d show an embodiment of the coupling apparatus 1 in which the second end portion 14 of the first pipe 10 is provided with a female portion 15. The female portion 15 is complementarily adapted to a male portion 25 projecting from the second end portion 24 of the second pipe 20. The female portion 15 and the male portion 25 are arranged for axial movement relative to each other.

One of the purposes of the female portion 15 and the complementarily fitting male portion 25 is to provide a coupling apparatus 1 in which bending moments are absorbed to the greatest possible degree by said female and male portions 15, 25 together with the adjacent end faces of the flanges 18, 28, and not by the bolts 32 located on the "tension side" of the coupling apparatus 1. The female and male portions 15, 25 thus contribute to the fact that the breaking load of the coupling apparatus 1 is, to a great degree, unaffected by a force component acting perpendicularly to the longitudinal axis of the drill string 100. Such a force component may typically arise in consequence of sea currents.

In addition to the female and male portions 15, 25 of the first pipe 10 and the second pipe 20, respectively, end portions of the flanges 18, 28 are also provided with a flange female portion 18' and a flange male portion 28' as shown in FIG. 4d.

Figure 4H:
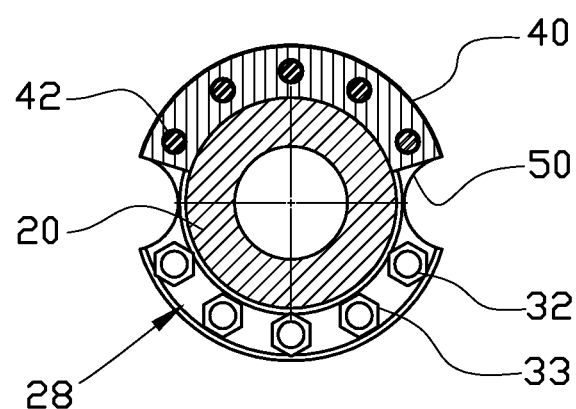
Figure 5A:
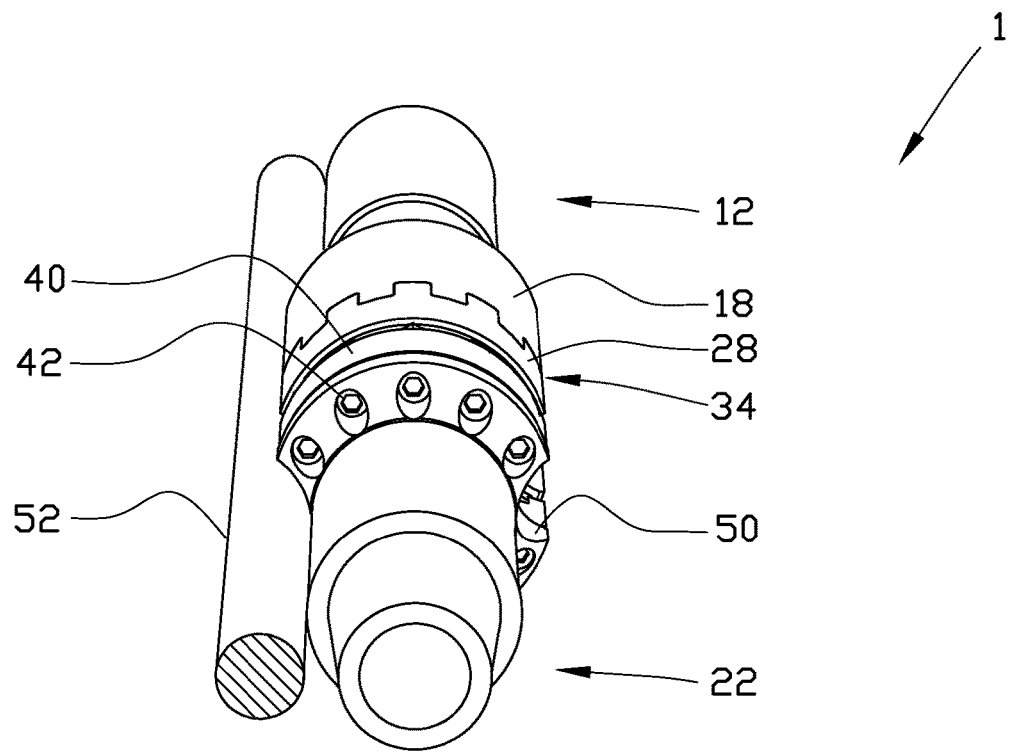
FIG. 5a shows a section in perspective, viewed at an angle from above and in a longitudinal direction of the coupling apparatus, in which, however, there is a cable extending along the coupling apparatus.
Figure 5B:
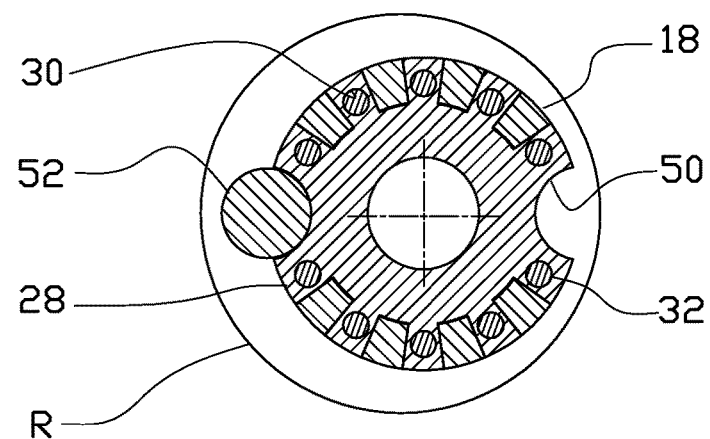
FIG. 5b shows a cross-section through a portion of the coupling apparatus and the cable shown in FIG. 5a, but the coupling apparatus and the cable are enclosed by a riser as shown in FIG. 1.
Figure 6:
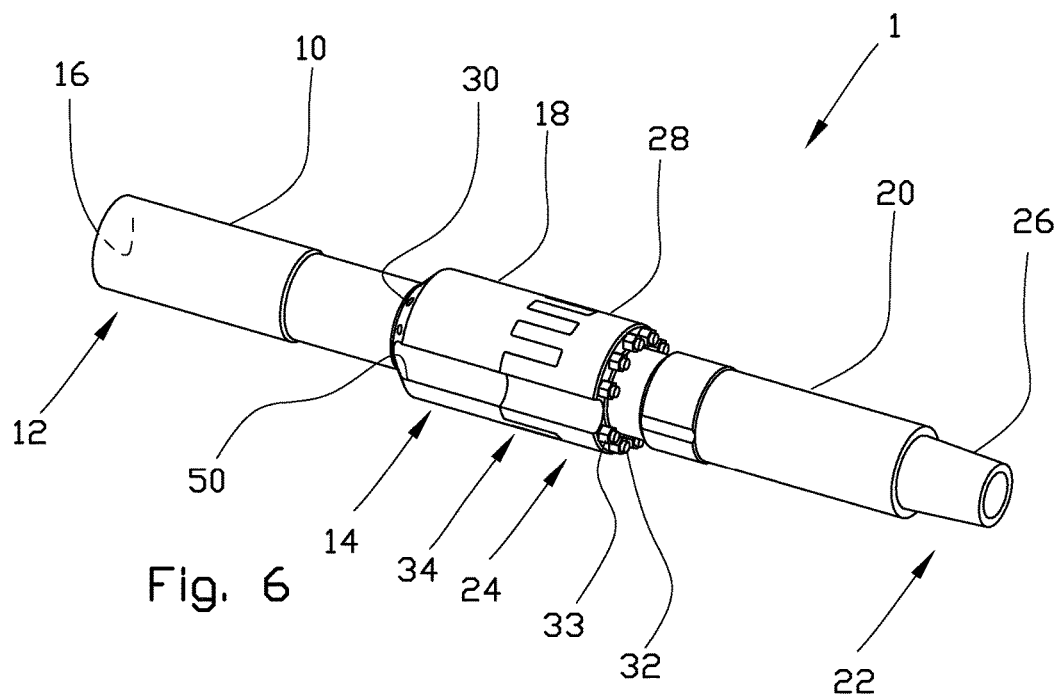
FIG. 6 shows, in perspective, a coupling apparatus which resembles the one shown in FIG. 3a, but without a collar.

Each of the female and male portions 15, 25 is provided with a shoulder, which shoulders are arranged to be brought into abutment against each other to form a sealing surface 17 so that the coupling apparatus 1 is fluid-tight. In the embodiment shown, the coupling apparatus 1 is configured to resist the same pressure as the drill string 100. FIGS. 4e to 4h show cross-sectional views, on a larger scale, seen through the lines C-C, D-D, E-E and F-F in FIG. 4a. However, for illustrative reasons, the insert 40 of FIG. 4h is shown only in an upper portion in which it has been placed to hold the five uppermost bolts 32 fixed against axial movement.

In FIGS. 3a to 6, the coupling apparatus 1 is provided with two recesses 50 arranged diagonally. The purpose of the recesses 50 is to house a portion of a cable 52 extending along the coupling apparatus 1 as shown in FIG. 5a and FIG. 5b. FIG. 5b is a section through the coupling apparatus 1 in the same place as section D-D of FIG. 4a. The cable 52 may typically be a so-called umbilical. The recess 50 is particularly useful in those cases in which the coupling apparatus 1 and the drill string 100 are surrounded by, for example, a riser R as indicated in FIG. 1 and in FIG. 5, as the total diameter of the coupling apparatus 1 and the cable 52 will be reduced by an amount corresponding to the radial extent of the recess 50. In FIG. 5b, R may represent a daylight opening in the so-called rotary table (the opening in the drilling floor), which is also known in the industry as a "rotary", or then R may represent the diameter of the riser as mentioned above.

As appears from the figures, the largest external diameter of the coupling apparatus 1 is determined by the external diameter of the flanges 18, 28. An apparatus 1 of the kind shown is configured to be moved inside the riser R or through the opening of the rotary table.

Reference is now made to FIGS. 7 to 10b relating to a variant of the coupling apparatus 1 in which it is configured to be able to receive a selectively releasable carrier sleeve 60 as shown in FIGS. 8a to 10b.

The purpose of the carrier sleeve 60 is to "override" the axial-load-carrying capacity of the coupling apparatus 1 determined by the bolts 32. For example, such an override may be desirable in those cases in which the drill string 100 is used to carry a heavy piece of well equipment, for example a Christmas tree, from the vessel W down to the seabed SB. Especially when the Christmas tree is being carried through the splash zone, axial loads exceeding the axial load at which the bolts 32 are configured to break, may arise in the drill string 100.

Figure 7:
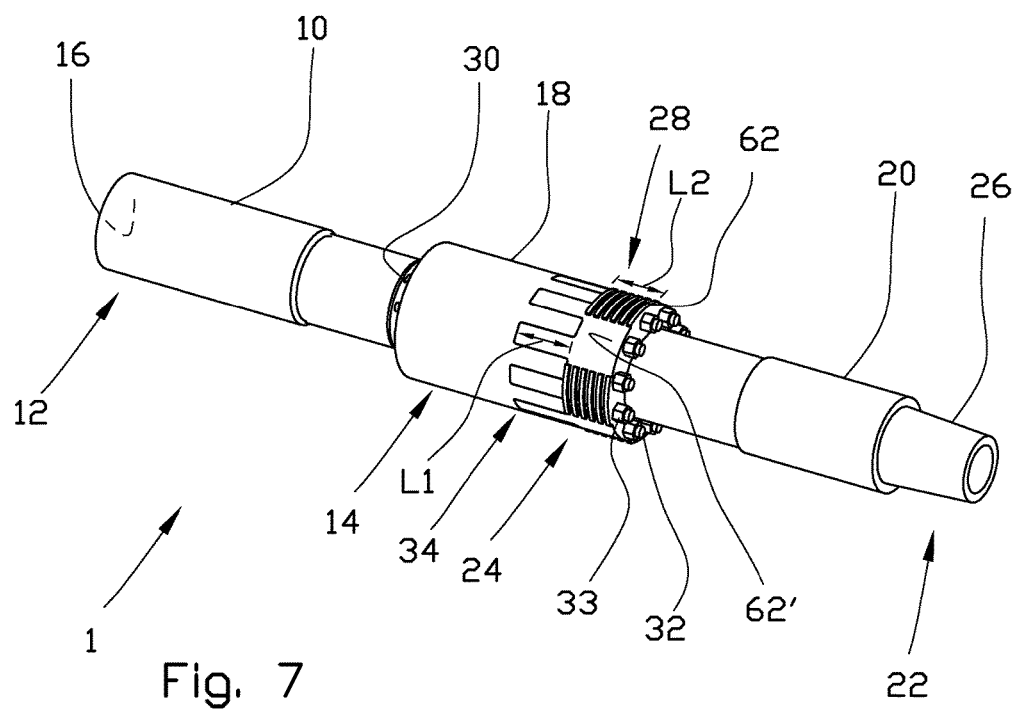
FIG. 7 shows, in perspective, a coupling apparatus which bears resemblance to the one shown in FIG. 6, but in which one of the flanges is provided with an engagement means which includes a series of radial latch splines arranged in a spaced-apart manner around a portion of the external surface of the coupling apparatus.

FIG. 7 shows an embodiment of the coupling apparatus 1, in which the second pipe 20 is provided with a series of latch splines 62 projecting radially from the surface of the flange 28. The latch splines 62 are arranged in series, spaced apart both around the surface of the flange 28 and in the axial direction. The flange 28 is provided with a smooth surface 62' between the latch splines 62.

In FIG. 7, the castellated element 34 has an extent L1 in the axial direction of the apparatus 1 which is larger than the overall axial extent L2 of the latch splines 62 of the flange. This has the effect of the castellated element 34 being in engagement until the latch splines 64 of the carrier sleeve 60 are at an axial distance from the latch splines 62 of the flange 28. Thus the castellated element 34 will prevent the carrier sleeve 60 from being brought into a strong mode in consequence of relative rotation between the first pipe 10 and the second pipe 20.

Further, the axial extent L1 of the castellated element 34 is preferably configured in such a way that it is larger than the extension of bolts 32 at rupture. Thereby is ensured that the bolts 32 will not be subjected to shear forces in consequence of relative rotation between the first pipe 10 and the second pipe 20 until the rupture has occurred.

Figure 8A:
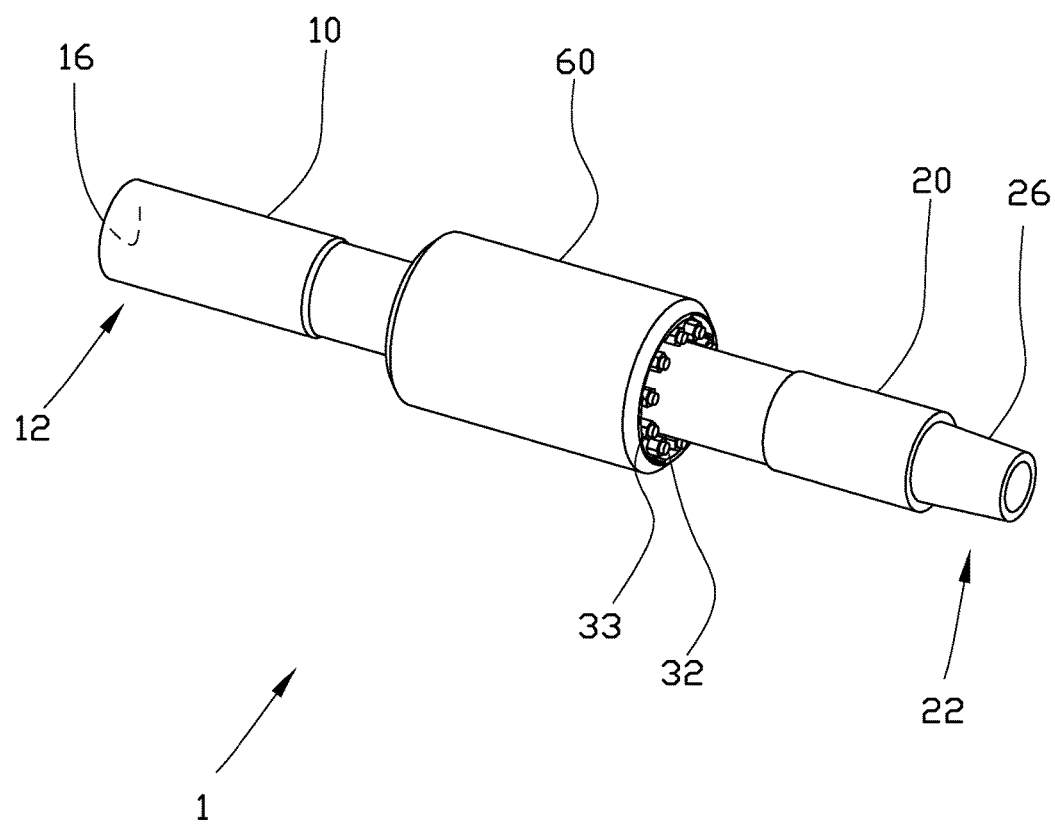
FIG. 8a shows the coupling apparatus of FIG. 7 after a carrier sleeve has been slid over a portion of the coupling apparatus.

In FIG. 8a, the carrier sleeve 60 is placed around the flanges 18, 28 of the coupling apparatus 1 as shown in FIG. 7.

Figure 8B:
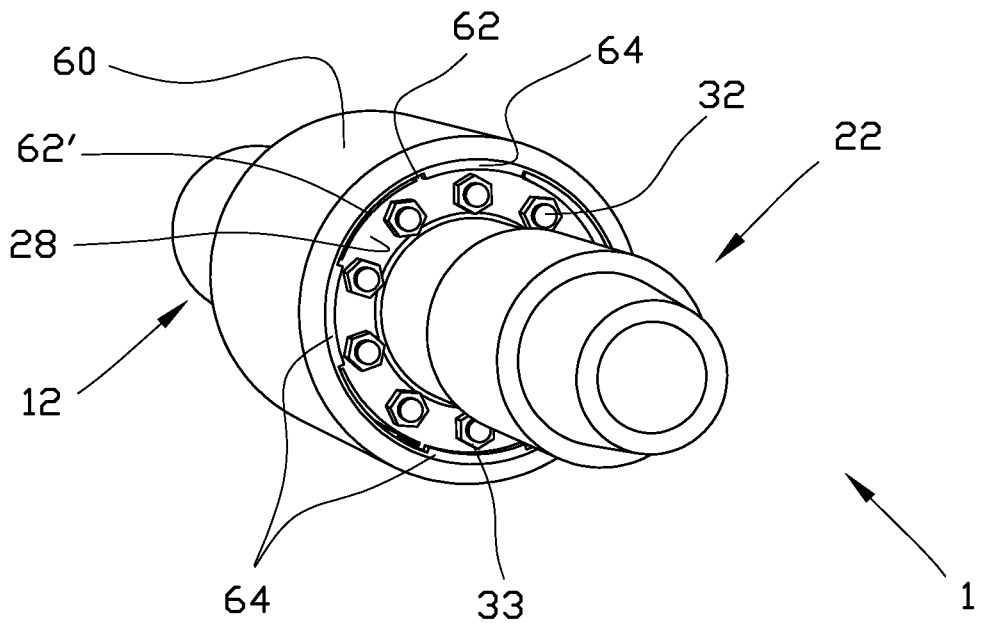
FIG. 8b shows, on a larger scale, the coupling apparatus of FIG. 8a, in which latch splines arranged in a projecting manner on the internal surface of the carrier sleeve are in engagement with the radial latch splines of the flange.
Figure 8C:
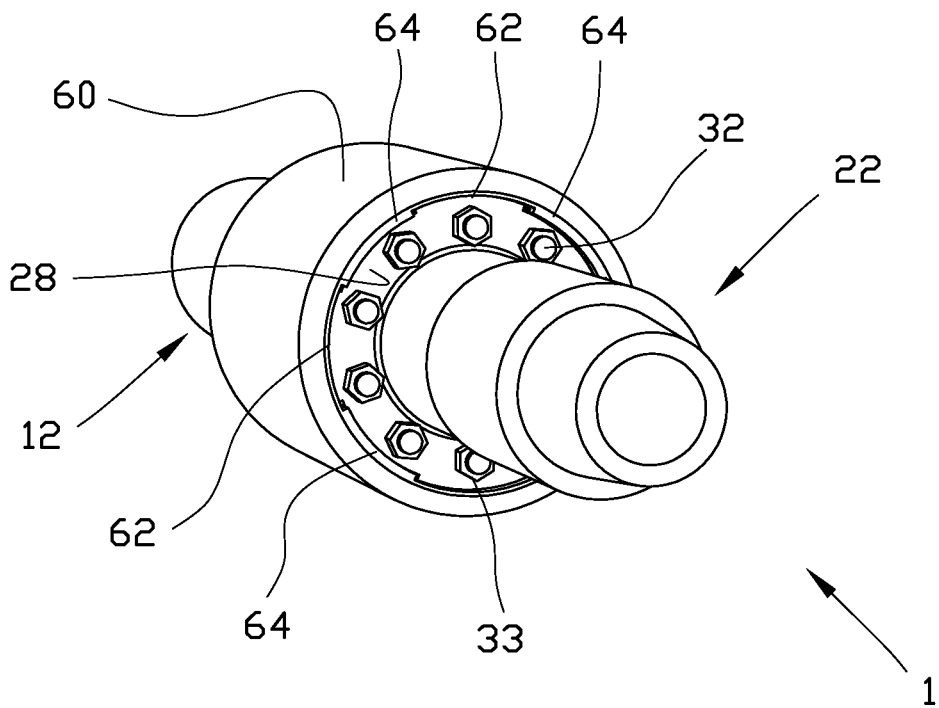
FIG. 8c shows the same as FIG. 8b, but the carrier sleeve has been turned ⅛ of a turn so that the internal latch splines of the carrier sleeve have been disengaged from the latch splines of the flange.

FIG. 8b shows the carrier sleeve 60 in a position in which the latch splines 62 of the flange 28 are in engagement with latch splines 64 projecting from the internal surface of the carrier sleeve 60. The latch splines 64 of the carrier sleeve have an extent in their longitudinal direction which is smaller than the spacing that the latch splines 62 have around the flange 28. When the carrier sleeve 60 is rotated from the position shown in FIG. 8b, in which it is in a "strong mode", to the position shown in FIG. 8c, the latch splines 64 of the carrier sleeve 60 will be disengaged from the latch splines 62 of the flange 28 and be moved over the smooth surface 62' of the flange 28. In FIG. 8c, the carrier sleeve 60 is thus in a "weak mode" or "safe mode", in which the axial-load-carrying capacity of the coupling apparatus 1 is determined by the overall axial-load-carrying capacity of the bolts 32.

Figure 9:
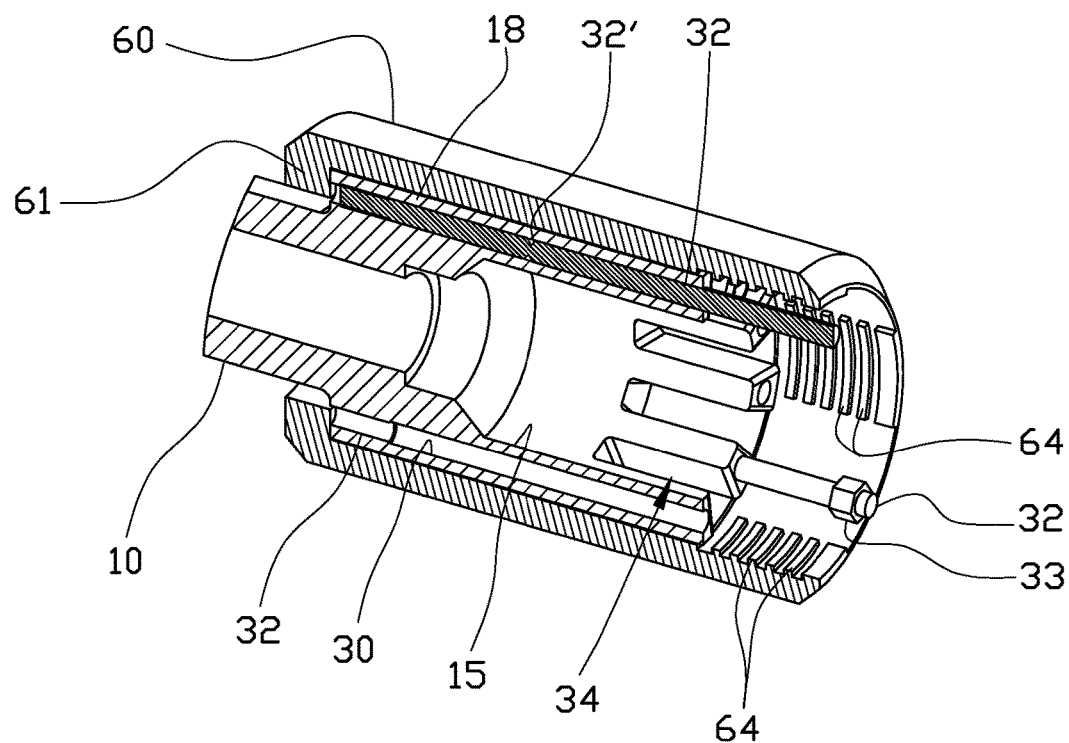

FIG. 9 shows, on a larger scale, a sectional view through a portion of the first pipe 10 surrounded by the carrier sleeve 60. The carrier sleeve 60 is provided with a shoulder 61 in the end portion that is the furthest away from the second pipe 20 in the position of application. The purpose of the shoulder 61 is to provide an abutment surface against an end portion of the flange 18 of the first pipe 10. In the embodiment shown, the carrier sleeve 60 is rotatable around the first pipe 10.

In FIG. 9, two of the bores 30 of the flange 18 are provided with bolts 32. For illustrative reasons, one of the bolts 32 is provided with a nut 33. However, it will be understood that the nut 33 must be removed before the second pipe 20 is brought into abutment against the first pipe 10.

The latch splines 62, 64 may be arranged perpendicularly to the longitudinal axis of the coupling apparatus. However, it will be an advantage if the latch splines 62, 64 are arranged at an angle different from 90°, with a pitch that is, so that the carrier sleeve 60 is subjected to an axial movement in the direction towards the second pipe 20 when the carrier sleeve is brought from a weak mode as shown in FIG. 8c into a strong mode as shown in FIG. 8b.

In an alternative embodiment, the latch splines 62, 64 may be threads. Threads require a larger rotation of the carrier sleeve 60 around the longitudinal axis of the coupling apparatus 1 than what is the case with the latch splines 62, 64 shown in the figures, which only require ⅛ of a turn. Thus, in some cases, the embodiment shown may be the one to be preferred, especially when the carrier sleeve is to be operated by means of an ROV.

FIG. 10a and FIG. 10b show an alternative embodiment of the coupling apparatus 1 shown in FIG. 8a to FIG. 9b.

In FIG. 10a, the shoulder 61 of the carrier sleeve 60 rests against the end portion of the flange 18 of the first pipe 10 in the same way as that of the carrier sleeve 60 shown in FIG. 8a. But, instead of the latch splines 64 of the carrier sleeve 60 being brought into engagement with the latch splines 62 arranged on the flange 28 of the second pipe 20, the latch splines 64 of the carrier sleeve 60 are arranged to be engaged with latch splines 62 arranged on a portion of a collar 38. The collar 38 is attached to the second pipe 20 by means of a threaded connection 23. The collar 38 is placed at a distance from the flange 28 of the pipe 20.

The latch splines 62, 64 shown in FIG. 10b may be threads.

The collar 38 shown in FIG. 10a is attached around the second pipe 20 after the bolts 32 have been passed through the bores 30 of the flanges 18, 28 and a fixed connection has been established.

A portion of the external surface of the collar 38 is provided with latch splines 62 of the same kind as that described for the flange 28 above.

As shown in FIG. 10a and FIG. 10b, the end portions of the bolts 32 projecting from the flange 28 of the second pipe 20 are protected by the carrier sleeve 60. Thus, in this embodiment, it is not necessary to have the insert 40 as shown in FIG. 3c, for example.

The carrier sleeve 60 shown in FIG. 10a is provided with openings 66. The purpose of the openings 66 is to be able to visually check, for example in a final inspection, that the assumed bolts 32 have been positioned in the coupling apparatus 1.

From the above description, it will thus be understood that the present invention provides a coupling apparatus 1 which, by means of at least two bolts 32, may form a controllable "weak link" connection, in which the breaking load of the bolts 32 may be determined solely from the tensile load of the drill string 100. Torsional load and axial load in consequence of bending moments may therefore be ignored. It is an advantage if the bolts 32 are slim, that is to say the bolts 32 have a high length-to-diameter ratio. In the figures, the slimness of the bolts is shown in the order of 20, the length being between the attachments of the bolts. However, the slimness may be greater or smaller than the one shown. The slimness of the bolts 32 together with a possible tensioning provides for a relatively accurate determination of the load-carrying capacity of each of the bolts.

To be able to fine-tune the axial-force-carrying capacity of the bolts 32, they may be provided with a turned-down portion 32' as illustrated in FIG. 9. A bolt 38 with a given diameter and slimness may thereby be adjusted relatively accurately to the desired axial-force-carrying capacity.

A lower portion of a drill string 100 which is provided with a coupling apparatus 1 of the kind that is shown in FIG. 7 and that is provided with a carrier sleeve 60, could be retrieved by bringing the first pipe 10 to rest against the second pipe 20 and then bringing the carrier sleeve 60 into a strong mode so that the coupling between the first pipe 10 and the second pipe 20 is restored. The lower portion of the drill string may thereby be retrieved.

As suggested initially, the coupling apparatus 1 could also be used in a bore in a formation below the seabed or, in those cases in which a carrier sleeve 60 is used for the apparatus 1, in a riser R, for example, as shown in FIG. 1. A possible use of a carrier sleeve 60 to control the axial-force-carrying capacity of the coupling apparatus 1 both ways between a strong mode and a weak mode will require a manipulating tool (not shown) which is configured to provide the desired rotation of the carrier sleeve 60. In one embodiment, such a manipulating tool may be a driving device such as a motor. The driving device is preferably arranged for remote control so that the carrier sleeve may be operated from a surface. Like, for example, an ROV which is used in the open sea, such a manipulating tool is not part of the present invention.

The invention claimed is:

1. A coupling apparatus for connecting two drill-pipe sections in a string of drill-pipe sections joined together by tool joints, the coupling apparatus comprising:
    a first pipe with a first end portion and a second end portion, the first end portion being provided with a tool joint for connection to a drill-pipe section; and
    a second pipe with a first end portion and a second end portion, the first end portion being provided with a tool joint for connection to a drill-pipe section;
    each of the second end portions of the pipes further being provided with a flange provided with at least two spaced-apart bores which are each arranged to receive a bolt so that the flanges and the bolts form a flange connection configured to hold the first pipe and the second pipe fixed against axial movement relative to each other, wherein each of the first pipe and the second pipe is provided with a mutual engagement means configured to prevent relative rotation thereof such that that the bolts are axial tension bolts subjected to axial forces only, the bolts being configured to rupture on a predetermined axial load;
    wherein the second end portion of one of the pipes is provided with a female portion for receiving a complementarily adapted male portion arranged in the second end portion of the other one of the pipes, and wherein the female portion and the male portion are arranged for axial displacement relative to each other.

2. The coupling apparatus as claimed in claim 1, wherein the engagement means includes a castellated element arranged in each of the flanges so that the castellated element of one of the flanges is complementarily adapted to the castellated element of the other one of the flanges.

3. The coupling apparatus as claimed in claim 1, wherein the end portions of the bolt are each connected to a respective flange portion, and wherein the bolt is axially displaceable through the bore of at least one of the flanges, and that the axially displaceable bolt is connected to said at least one flange by means of a nut which has been brought into abutment against an end portion of the flange.

4. The coupling apparatus as claimed in claim 1, wherein the flange connection is provided with at least one recess extending in a longitudinal direction of the coupling apparatus, the recess being arranged to house at least a portion of a cable extending along the coupling apparatus.

5. The coupling apparatus as claimed in claim 1, wherein the coupling apparatus is further provided with a selectively releasable carrier sleeve which surrounds at least a portion of the first pipe and the second pipe, the carrier sleeve being arranged to rotate around the longitudinal axis of the coupling apparatus between a first position and a second position, the carrier sleeve being lockingly engaged with both the first pipe and the second pipe in the first position, but the carrier sleeve being disengaged from at least one of the first pipe and the second pipe in the second position.

6. The coupling apparatus as claimed in claim 5, wherein the carrier sleeve is configured to carry an axial force greater than the axial force that can be carried by the at least two bolts together.

7. The coupling apparatus as claimed in claim 5, wherein engagement between the first pipe and the second pipe is provided by an engagement means which includes a series of latch splines spaced apart around a portion of the external surface of the coupling apparatus, and a series of latch splines arranged on a portion of the internal surface of the carrier sleeve, one of the series of latch splines having a length which is smaller than or equal to the spacing of the series of latch splines of the second one of the series of latch splines.

8. The coupling apparatus as claimed in claim 5, wherein engagement between the first pipe and the second pipe is provided by an engagement means which includes threads arranged around a portion of the external surface of the coupling apparatus and a series of complementarily fitting threads arranged on a portion of the internal surface of the carrier sleeve.

9. The coupling apparatus as claimed in claim 7, wherein the engagement means of the coupling apparatus is arranged on a portion of one of the flanges of the coupling apparatus and on the portion of the carrier sleeve.

10. The coupling apparatus as claimed in claim 1, wherein at least one of the pipes is provided with a collar arranged at a distance from the flange, between the flange and the first end portion of the pipe.

11. The coupling apparatus as claimed in claim 10, wherein the engagement means of the coupling apparatus is arranged on the collar which is attached to one of the pipes at a distance from the flange, between the flange and the first end portion of the pipe.

12. The coupling apparatus as claimed in claim 10, wherein at least one insert is arranged around one or more portions of the pipe between the collar and the flange, the insert being configured to restrict an axial movement of the bolts.

13. A method of providing a controllable weak connection in a drill string arranged to be in a locked-to-bottom mode, the method comprising:
arranging a coupling apparatus for connecting two drill-pipe sections in a string of drill-pipe sections joined together by tool joints, the coupling apparatus comprising:
a first pipe with a first end portion and a second end portion, the first end portion being provided with a tool joint for connection to a drill-pipe section; and
a second pipe with a first end portion and a second end portion, the first end portion being provided with a tool joint for connection to a drill-pipe section;
each of the second end portions of the pipes further being provided with a flange provided with at least two spaced-apart bores which are each arranged to receive a bolt so that the flanges and the bolts form a flange connection configured to hold the first pipe and the second pipe fixed against axial movement relative to each other, wherein each of the first pipe and the second pipe is provided with a mutual engagement means configured to prevent relative rotation thereof, wherein the bolts are axial tension bolts subjected to axial forces only and are configured to rupture on a predetermined axial load;
wherein the second end portion of one of the pipes is provided with a female portion for receiving a complementarily adapted male portion arranged in the second end portion of the other one of the pipes, and wherein the female portion and the male portion are arranged for axial displacement relative to each other; and
wherein a predetermined axial-load-carrying capacity of the coupling apparatus is provided by the bolts connecting the flanges arranged on the first pipe and the second pipe of the coupling apparatus; and
fitting the coupling apparatus in a portion of the drill string.

14. The method according to claim 13, further comprising pre-tensioning the bolts of the coupling apparatus.

15. The method according to claim 13,
further comprising providing the coupling apparatus with a selectively releasable carrier sleeve which surrounds at least a portion of the first pipe and the second pipe, the carrier sleeve being arranged to rotate around the longitudinal axis of the coupling apparatus between a first position and a second position, the carrier sleeve being lockingly engaged with both the first pipe and the second pipe in the first position, but the carrier sleeve being disengaged from at least one of the first pipe and the second pipe in the second position.

16. A drill string including a coupling apparatus for connecting two drill-pipe sections in a string of drill-pipe sections joined together by tool joints, the coupling apparatus comprising:
a first pipe with a first end portion and a second end portion, the first end portion being provided with a tool joint for connection to a drill-pipe section;
a second pipe with a first end portion and a second end portion, the first end portion being provided with a tool joint for connection to a drill-pipe section;
each of the second end portions of the pipes further being provided with a flange provided with at least two spaced-apart bores which are each arranged to receive a bolt so that the flanges and the bolts form a flange connection configured to hold the first pipe and the second pipe fixed against axial movement relative to each other, wherein each of the first pipe and the second pipe is provided with a mutual engagement means configured to prevent relative rotation thereof, and that the bolts are axial tension bolts subjected to axial forces only, the bolts configured to rupture on a predetermined axial load;

wherein the second end portion of one of the pipes is provided with a female portion for receiving a complementarily adapted male portion arranged in the second end portion of the other one of the pipes, and wherein the female portion and the male portion are arranged for axial displacement relative to each other.

* * * * *